Patented Oct. 21, 1941

2,260,034

UNITED STATES PATENT OFFICE 2,260,034

CERAMIC MATERIALS

Erich Krautz, Berlin-Charlottenburg, and Wilfried Meyer, Berlin-Birkenwerder, Germany, assignors to General Electric Company, a corporation of New York No Drawing. Application June 22, 1938, Serial No. 215,308. In Germany June 28, 1937

3 Claims. (Cl. 106—46)

The present invention provides ceramic materials having low dielectric losses which are particularly useful in electric devices operating with high frequency currents, as for example radio and therapy devices.

The compositions embodying our invention comprise magnesium oxide as a main constituent, and contain as minor constituents metallic oxides, such as cobalt oxide and nickel oxide, used preferably together with beryllium oxide, which form mixed crystals when the compositions are fired, resulting in dense ceramic bodies characterized by low power losses (tan $\delta$) and superior dielectric properties.

In carrying out our invention the magnesium oxide is given a preliminary firing in air for about one-half hour at a temperature of about 1550° C. and then is ground and sieved to give a material having a grain size not more than 0.06 mm. diameter.

Cobalt or nickel oxide, or a mixture thereof, in quantities within a range of about 1 to 15 per cent of the total mixture are added in an unfired but finely-divided state. An addition of about 5 to 10 per cent is preferred. Preferably beryllium oxide is added also, ordinarily a few per cent up to eight per cent being sufficient. The beryllium oxide should be freed carefully from impurities. The formation of mixed crystals is facilitated by the beryllium oxide additions. The duration of firing thereby may be decreased to be completed in about one-half hour. In fact beryllium oxide is not added, the firing may vary from one-half to one or two hours.

The mixture is ground in a suitable ball mill for about four hours, in the presence of water, three parts of water to one part of oxide being used. After grinding, the mass is filtered, dried at about 150 to 200° C., reground and sieved to yield a powder having a grain size of about 0.06 mm. diameter.

Bodies of desired form are pressed from this powder in a steel mold at a pressure of several hundred pounds to the square inch. The molded bodies are fired in air at a temperature of about 1550 to 1650° C., the lower firing temperatures being used with the larger additions of addition oxide, and vice versa. During firing which may vary from one-half to one or two hours, the molded bodies preferably are supported on highly sintered supports of magnesium oxide covered with coarse-grained magnesium oxide powder.

The fired products are hard, dense ceramic bodies of low porosity and absorptivity and good dielectric properties, their dielectric constants being about 7.5 to 9.5.

The following table, giving energy loss factors for designated compositions, illustrates the benefits derived from our invention in the high frequency insulation field, the measurements being made at room temperature.

| Compositions | | | Loss factor (tan $\delta$) for wave lengths of 25 to 1000 meters |
|---|---|---|---|
| MgO | NiO | BeO | |
| Parts 99 | Parts 1 | Parts 5 | 1 to 2×10⁻⁴ (per cent power factor=.01 to .02%). |
| 95 | 5 | 5 | 1 to 3×10⁻⁴ (per cent power factor=.01 to .03%). |

| Compositions | | | Loss factor (tan $\delta$) for wave lengths of 25 to 1000 meters |
|---|---|---|---|
| MgO | CoO | BeO | |
| Parts 99 | Parts 1 | Parts 5 | 2 to 5×10⁻⁴ (per cent power factor=.02 to .05%). |
| 97 | 3 | 5 | 1 to 4×10⁻⁴ (per cent power factor=.01 to .04%). |
| 95 | 5 | 5 | 1 to 3×10⁻⁴ (per cent power factor=.01 to .03%). |

| Compositions | | Loss factor (tan $\delta$) for wave lengths of 25 to 1000 meters |
|---|---|---|
| MgO | NiO | |
| Parts 99 | Parts 1 | 1 to 2.7×10⁻⁴ (per cent power factor=.01 to .027%). |
| 97 | 3 | 1 to 1.5×10⁻⁴ (per cent power factor=.01 to .015%). |
| 95 | 5 | 1 to 3×10⁻⁴ (per cent power factor=.01 to .03%). |

| Compositions | | Loss factor (tan $\delta$) for wave lengths of 25 to 1000 meters |
|---|---|---|
| MgO | CoO | |
| Parts 99 | Parts 1 | 1 to 2×10⁻⁴ (per cent power factor=.01 to .02%). |
| 97 | 3 | 1 to 2.5×10⁻⁴ (per cent power factor=.01 to .025%). |
| 95 | 5 | 1 to 3×10⁻⁴ (per cent power factor=.01 to 0.3%). |

The dielectric losses for the bodies without beryllium oxide are some bit lower than those for bodies with beryllium oxide, supposing that the bodies without beryllium oxide are very well dried. When used in air of high humidity, however, the bodies with about 5% beryllium oxide have a power loss (tan $\delta$) somewhat lower than those compositions without beryllium oxide, because by the addition of beryllium oxide the ceramic bodies become more dense.

In general, the energy losses of a magnesia ceramic increase somewhat with increase of addition material. The observed values of the loss angles appear to be caused by small differences in the crystal structure. With additions of nickel or cobalt oxide as low as one per cent, the resulting bodies may not be wholly homogeneous and hence the losses may not be entirely uniform.

The resulting bodies may be joined by fusion to glasses of suitable temperature coefficient.

What we claim as new and desire to secure by Letters Patent of the United States is:

1. Hard, dense ceramic insulating materials consisting substantially of magnesium oxide and containing a minor addition of an oxide of the class consisting of nickel and cobalt oxide, together with beryllium oxide.

2. Hard, dense ceramic materials consisting of magnesium oxide, a few per cent of an oxide of the class consisting of nickel and cobalt oxide, and a few per cent of beryllium oxide.

3. Hard, dense ceramic materials having low dielectric losses consisting of magnesium oxide, about 5 per cent beryllium oxide, and about 1 to 15 per cent of nickel oxide.

ERICH KRAUTZ.
WILFRIED MEYER.

CERTIFICATE OF CORRECTION.

Patent No. 2,260,034.                                                October 21, 1941.

ERICH KRAUTZ. ET AL.

It is hereby certified that error appears in the printed specification of the above numbered patent requiring correction as follows: Page 1, first column, line 50, after "one-half" insert --hour--; and second column, line , last line of the table, for "0.3%" read --.03%--; and that the said Letters Patent should be read with this correction therein that the same may conform to the record of the case in the Patent Office.

Signed and sealed this 9th day of December, A. D. 1941.

Henry Van Arsdale, (Seal)                        Acting Commissioner of Patents.